US012228050B2

(12) United States Patent
Senoo et al.

(10) Patent No.: US 12,228,050 B2
(45) Date of Patent: Feb. 18, 2025

(54) STEAM TURBINE, BLADE, AND METHOD FOR IMPROVING PERFORMANCE AND RELIABILITY OF STEAM TURBINE

(71) Applicant: MITSUBISHI HEAVY INDUSTRIES, LTD., Tokyo (JP)

(72) Inventors: Shigeki Senoo, Tokyo (JP); Soichiro Tabata, Yokohama (JP); Tetsuya Sawatsubashi, Tokyo (JP); Hiroyuki Mitsui, Tokyo (JP); Kunio Asai, Tokyo (JP); Ryuichi Matsubara, Tokyo (JP); Kiyoshi Tatsuhara, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/943,696

(22) Filed: Sep. 13, 2022

(65) Prior Publication Data

US 2023/0017038 A1 Jan. 19, 2023

Related U.S. Application Data

(63) Continuation of application No. PCT/JP2021/013492, filed on Mar. 30, 2021.

(30) Foreign Application Priority Data

Mar. 31, 2020 (JP) ................................ 2020-062296

(51) Int. Cl.
*F01D 5/28* (2006.01)
*F01D 25/24* (2006.01)

(52) U.S. Cl.
CPC ............ *F01D 5/288* (2013.01); *F01D 25/24* (2013.01); *F05D 2220/31* (2013.01); *F05D 2230/90* (2013.01); *F05D 2300/611* (2013.01)

(58) Field of Classification Search
CPC ...... F01D 5/288; F01D 25/24; F05D 2220/31; F05D 2230/90; F05D 2300/611
See application file for complete search history.

(56) References Cited

U.S. PATENT DOCUMENTS 9,827,735 B2 11/2017 Schmidt et al.

FOREIGN PATENT DOCUMENTS

CN 104779835 7/2015
EP 3628922 A1 * 4/2020

(Continued)

OTHER PUBLICATIONS

Machine Translation of EP3628922A1 PDF File Name: "EP3628922A1_Machine_Translation.pdf".*

(Continued)

*Primary Examiner* — Grant Moubry
*Assistant Examiner* — Ruben Picon-Feliciano
(74) *Attorney, Agent, or Firm* — Wenderoth, Lind & Ponack, L.L.P.

(57) ABSTRACT

A steam turbine according to the present invention comprises: a shaft which rotates about the rotation axis thereof; a plurality of moving blades which extend in the radial direction from the outer peripheral surface of the shaft and which are arranged along the circumferential direction; a casing main body which covers the shaft and the moving blades from the outer peripheral side; a plurality of stationary blades which are arranged on the inner circumferential surface of the casing main body; and a substance supply unit which supplies, to the surfaces of the moving blades and/or the surfaces of the stationary blades, a film forming substance that is hydrophobic, wherein the substance supply unit has a storage unit, a supply passage which is formed inside the casing and through which the film forming substance flows, and discharge units which are formed (Continued)

inside the moving blades and/or the stationary blades and which guide the film forming substance to the surfaces.

12 Claims, 5 Drawing Sheets

(56) References Cited

FOREIGN PATENT DOCUMENTS

| | | | | |
|---|---|---|---|---|
| FR | 1171738 | | | 1/1959 |
| JP | 2000-506246 | | | 5/2000 |
| JP | 2009-138540 | | | 6/2009 |
| JP | 2010-116922 | | | 5/2010 |
| JP | 2012-202314 | | | 10/2012 |
| JP | 2013231394 | A | * | 11/2013 |
| JP | 2014-040803 | | | 3/2014 |
| JP | 5703082 | | | 4/2015 |
| JP | 5804985 | | | 11/2015 |
| WO | 97/34075 | | | 9/1997 |

OTHER PUBLICATIONS

Machine Translation of JP2013231394A PDF File Name: "JP2013231394A_Machine-Translation.pdf".*
International Search Report issued May 25, 2021 in International Application No. PCT/JP2021/013492, with Machine Translation.
Written Opinion of the International Searching Authority issued May 25, 2021 in International Application No. PCT/JP2021/013492, with Machine Translation.

* cited by examiner

STEAM TURBINE, BLADE, AND METHOD FOR IMPROVING PERFORMANCE AND RELIABILITY OF STEAM TURBINE

This application is a continuation application based on a PCT Patent Application No. PCT/JP2021/013492 whose priority is claimed on Japanese Patent Application No. 2020-062296. The contents of the PCT Application is incorporated herein by reference.

TECHNICAL FIELD

The present disclosure relates to a steam turbine, a blade, and a method for improving performance and reliability of a steam turbine.

This application claims the priority of Japanese Patent Application No. 2020-062296 filed in Japan on Mar. 31, 2020, the contents of which are incorporated herein by reference.

BACKGROUND ART

A steam turbine includes a shaft that can rotate around a rotation axis, a plurality of turbine rotor blade stages that are arranged at intervals in a rotation axis direction on an outer peripheral surface of the shaft, a casing that covers the shaft, and the turbine rotor blade stage from an outer peripheral side, and a plurality of turbine stator blade stages that are alternately arranged with turbine rotor blade stages on an inner peripheral surface of the casing. An intake port through which steam is taken in from the outside is formed on an upstream side of the casing, and an exhaust port is formed on a downstream side thereof. After a flow direction and a velocity of high-temperature and high-pressure steam taken in from the intake port are adjusted at the turbine stator blade stage, the steam is converted into a rotational force of the shaft at the turbine rotor blade stage.

The steam passing through the turbine loses energy from the upstream side to the downstream side, and the temperature and pressure thereof decrease. Therefore, in the turbine stator blade stage on the most downstream side, a portion of steam is condensed and exists in an air flow as fine water droplets, and a portion of the water droplets adheres to the surface of the turbine stator blade. These water droplets quickly grow on a blade surface to form a liquid film. The liquid film is constantly exposed to a high-speed steam flow around the liquid film, but when the liquid film grows further and becomes thicker, a portion of the liquid film is torn by the steam flow and scattered in the form of coarse droplets. The scattered droplets flow to the downstream side while gradually accelerating due to the steam flow. As a size of the droplet increases, a mass increases. Accordingly, it is difficult for the steam flow to accelerate to a steam velocity, and mainstream steam cannot pass between the turbine rotor blades and collides with the turbine rotor blades. Since a peripheral speed of the turbine rotor blade may exceed a speed of sound, when the scattered droplets collide with the turbine rotor blade, the droplets may erode the surface and generate erosion. In addition, the collision of droplets may hinder a rotation of the turbine rotor blade, resulting in braking loss.

Various techniques have been proposed so far in order to prevent the adhesion and growth of such droplets. For example, PTL 1 below describes a technique for removing moisture generated on a surface of a turbine nozzle (turbine stator blade) by heating the surface with an electric heating unit. PTL 1 also describes a technique for optimizing an amount of heating by the electric heating unit by measuring a thickness of a water film.

CITATION LIST

Patent Literature

[PTL 1] Japanese Patent No. 5703082

SUMMARY OF INVENTION

Technical Problem

However, a velocity of a fluid flowing between turbine stator blades is high enough to reach 200 to 400 m/s as an example. A thickness of a water film is about several hundred microns. Therefore, in the technique described in PTL 1, a large error may occur in measurement of the thickness of the water film, and as a result, moisture may not be properly removed by an electric heating unit.

The present disclosure has been made to solve the above problems, and an object of the present disclosure is to provide a steam turbine and a blade having further improved performance and reliability and a method for improving the performance and reliability of a steam turbine.

Solution to Problem

In order to solve the above problems, according to one aspect of the present disclosure, there is provided a steam turbine including: a shaft that rotates around a rotation axis; a plurality of rotor blades that extend in a radial direction from an outer peripheral surface of the shaft and are arranged in a circumferential direction; a casing main body that covers the shaft and the rotor blade from an outer peripheral side; a plurality of stator blades that extend in the radial direction from a position on an upstream side of the rotor blade on an inner peripheral surface of the casing main body and are arranged in the circumferential direction; and a substance supply unit that supplies, to a surface of at least one of the rotor blade and the stator blade, a film forming substance having hydrophobicity to water droplets adhering to the surface, in which the substance supply unit includes a storage portion that stores the film forming substance, a supply flow path which is formed inside the casing main body and through which the film forming substance guided from the storage portion flows, and a discharge unit that is formed inside at least one of the rotor blade and the stator blade and guides the film forming substance to the surface.

According to another aspect of the present disclosure, there is provided a method for improving performance and reliability of a steam turbine, the method including a step of supplying, to a surface of at least one of a rotor blade and a stator blade of a steam turbine, a film forming substance having hydrophobicity to water droplets adhering to the surface.

Advantageous Effects of Invention

According to the present disclosure, it is possible to provide a steam turbine and a blade having further improved performance and reliability and a method for improving the performance and reliability of a steam turbine.

DESCRIPTION OF EMBODIMENTS

First Embodiment (Steam Turbine Configuration)

Figure 1:
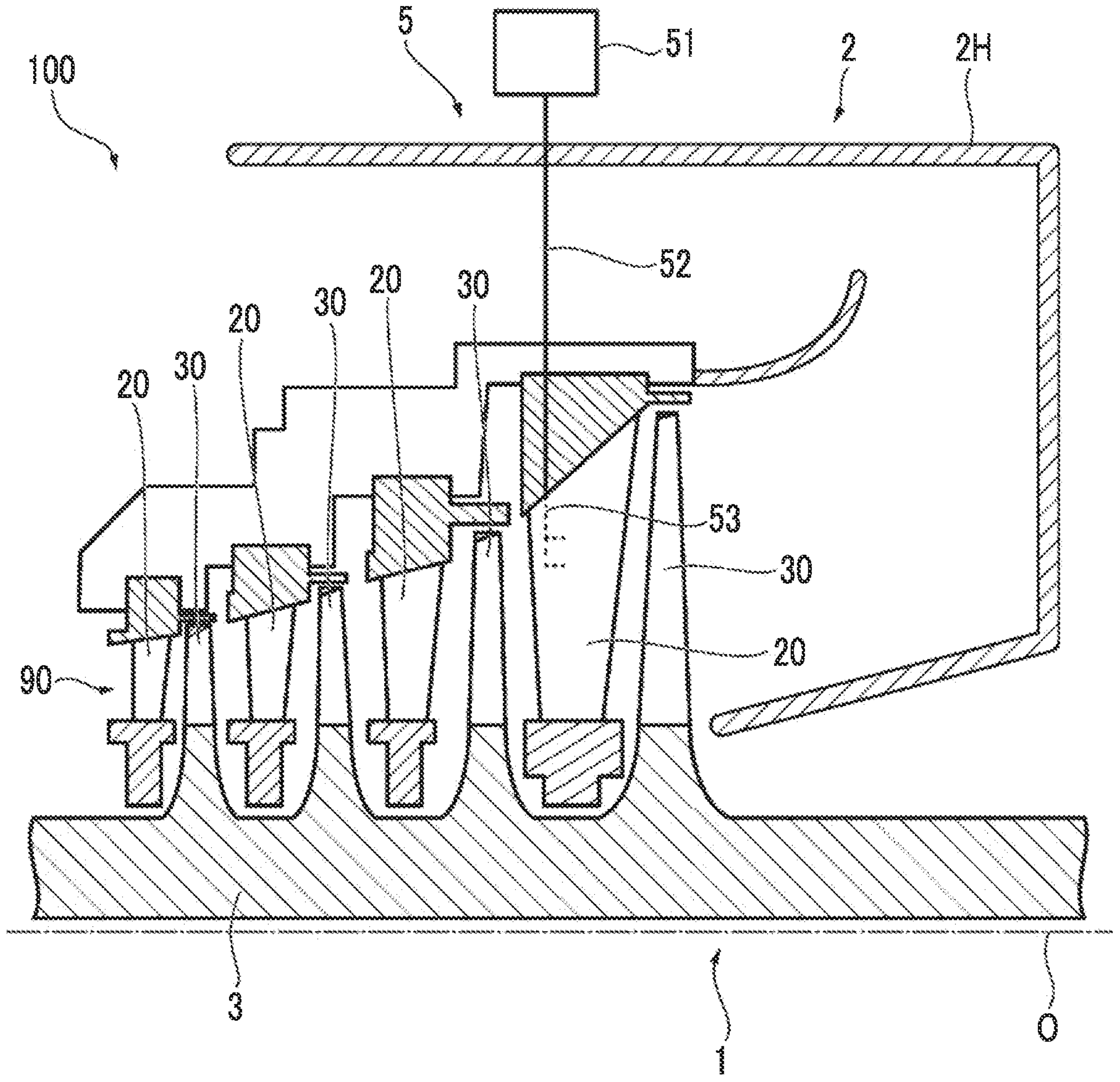
FIG. 1 is a diagram showing a configuration of a steam turbine according to a first embodiment of the present disclosure.
Figure 2:
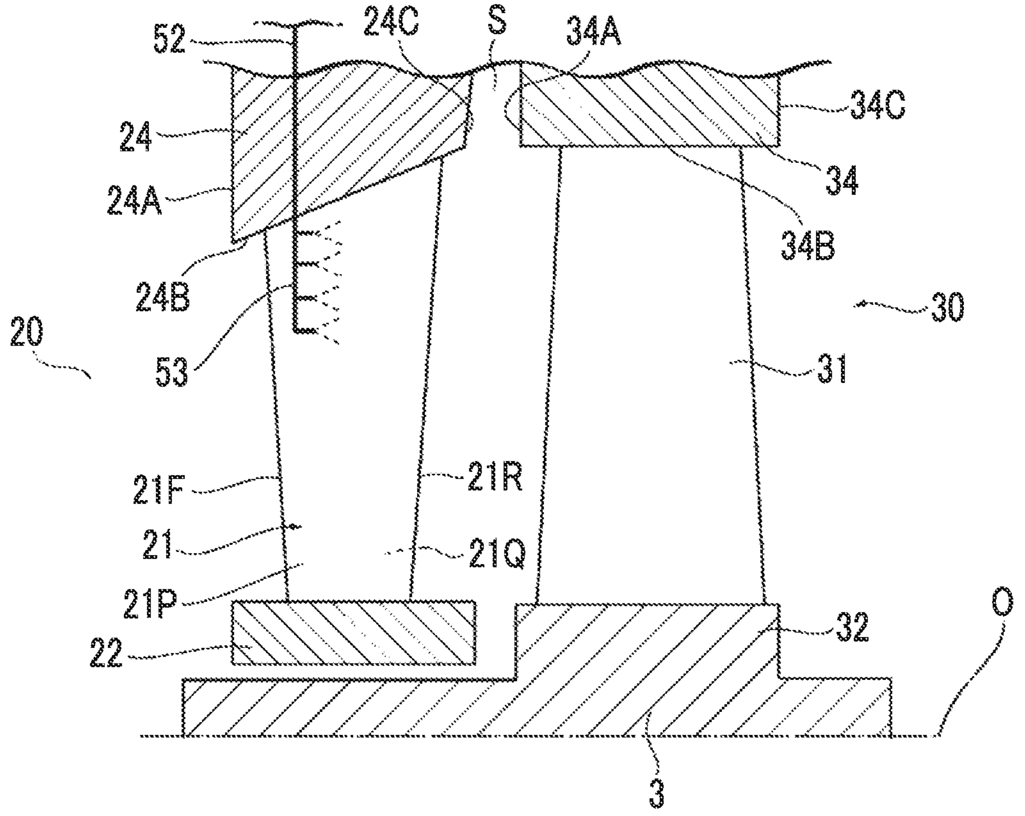
FIG. 2 is an enlarged view showing an internal configuration of the steam turbine according to the first embodiment of the present disclosure.

Hereinafter, a steam turbine 100 according to a first embodiment of the present disclosure will be described with reference to FIGS. 1 to 4. As shown in FIGS. 1 and 2, the steam turbine includes a steam turbine rotor 1 extending along a direction of a rotation axis O, a steam turbine casing 2 covering the steam turbine rotor 1 from an outer peripheral side, and a substance supply unit 5.

The steam turbine rotor 1 has a shaft 3 extending along the rotation axis O and a plurality of rotor blades 30 provided on an outer peripheral surface of the shaft 3. The plurality of rotor blades 30 are arranged at regular intervals in a circumferential direction of the shaft 3. Also in the direction of the rotation axis O, a plurality of rows of rotor blades 30 (rotor blade stages) are arranged at regular intervals. As shown in FIG. 2, the rotor blade 30 has a rotor blade main body 31 (turbine rotor blade) and a rotor blade shroud 34. The rotor blade main body 31 protrudes radially outward from an outer peripheral surface of the steam turbine rotor 1. The rotor blade main body 31 has an airfoil-shaped cross section when viewed from the radial direction. A rotor blade shroud 34 is provided at a tip portion (radially outer end portion) of the rotor blade main body 31. A platform 32 is integrally provided with the shaft 3 at a base end portion (radially inner end portion) of the rotor blade main body 31.

As shown in FIG. 1, the steam turbine casing 2 includes a substantially tubular casing main body 2H (casing main body) that covers the steam turbine rotor 1 from the outer peripheral side, and a stator blade 20 provided on an inner peripheral surface of the casing main body 2H. A steam supply pipe (not shown) for taking in steam is provided on one side of the steam turbine casing 2 in the direction of the rotation axis O. A steam discharge pipe (not shown) for discharging steam is provided on the other side of the steam turbine casing 2 in the direction of the rotation axis O. Steam flows inside the steam turbine casing 2 from one side toward the other side in the direction of the rotation axis O. In the following description, the direction in which steam flows is simply referred to as a "flow direction". Further, a side where the steam flows is called an upstream side, and a side where the steam flows away is called a downstream side.

A plurality of rows of stator blades 20 are provided on an inner peripheral surface of the steam turbine casing 2. As shown in FIG. 2, the stator blade 20 has a stator blade main body 21 (turbine stator blade), a stator blade shroud 22, and an outer peripheral ring 24. The stator blade main body 21 is a blade-shaped member connected to the inner peripheral surface of the steam turbine casing via the outer peripheral ring 24. Further, a stator blade shroud 22 is provided at a tip portion (radially inner end portion) of the stator blade main body 21. Similar to the rotor blade 30, a plurality of stator blades 20 are arranged on the inner peripheral surface along the circumferential direction and the direction of the rotation axis O. The rotor blades 30 are arranged so as to enter regions between the plurality of adjacent stator blades 20. That is, the stator blade 20 and the rotor blade 30 extend in a direction (radial direction with respect to the rotation axis O) intersecting the steam flow direction. In the following description, the stator blade 20 and the rotor blade 30 may be collectively referred to as a blade 90.

The steam is supplied to the inside of the steam turbine casing 2 via the steam supply pipe on the upstream side. While passing through the inside of the steam turbine casing 2, steam alternately passes through the stator blades 20 and the rotor blades 30. The stator blade 20 rectifies the flow of steam, and the rectified mass of steam pushes the rotor blade 30 to give rotational force to the steam turbine rotor 1. The rotational force of the steam turbine rotor 1 is taken out from a shaft end and used to drive an external device (generator or the like). As the steam turbine rotor 1 rotates, steam is discharged toward a subsequent device (condenser or the like) through a steam discharge pipe on the downstream side.

Although not shown in detail, the shaft 3 is rotatably supported inside the steam turbine casing 2 by a journal bearing and a thrust bearing.

(Configuration of Stator Blade Main Body)

Next, a configuration of the stator blade main body 21 will be described with reference to FIG. 2. The stator blade main body 21 extends in the radial direction (radial direction with respect to the rotation axis O), which is a direction intersecting the flow direction. A cross section of the stator blade main body 21 seen from the radial direction has an airfoil shape. More specifically, a leading edge 21F, which is an end edge on the upstream side in the flow direction, has a curved surface shape. A trailing edge 21R, which is an end edge on the downstream side, has a tapered shape because a dimension in the circumferential direction is gradually reduced when viewed from the radial direction. From the leading edge 21F to the trailing edge 21R, the stator blade main body 21 is gently curved from one side in the circumferential direction with respect to the rotation axis O toward the other side. Further, the dimension of the stator blade main body 21 in the direction of the rotation axis O decreases toward the inner side in the radial direction. Of a pair of surfaces of the stator blade main body 21 facing the circumferential direction, the surface facing the upstream side is a pressure surface 21P, and the surface facing the downstream side is a negative pressure surface 21Q.

An outer peripheral ring 24 is attached to a radially outer end portion of the stator blade main body 21. The outer peripheral ring 24 has an annular shape centered on the rotation axis O. Of surfaces of the outer peripheral ring 24, the surface facing the upstream side is a ring upstream surface 24A, the surface facing the inner peripheral side is a ring inner peripheral surface 24B, and the surface facing the downstream side is a ring downstream surface 24C. The ring upstream surface 24A and the ring downstream surface 24C extend in the radial direction with respect to the rotation axis O. A radial dimension of the ring upstream surface 24A is larger than a radial dimension of the ring downstream surface 24C. As a result, as an example in the present embodiment, the ring inner peripheral surface 24B gradually expands toward the outside in the radial direction toward the downstream side. The outer peripheral ring 24 forms a portion of the steam turbine casing 2. That is, the ring inner peripheral surface 24B is a portion of the inner peripheral surface of the steam turbine casing 2.

The ring downstream surface 24C faces the rotor blade shroud 34 of the rotor blade 30 adjacent to the downstream side of the stator blade 20 with a gap S. Of surfaces of the rotor blade shroud 34, the surface facing the upstream side is a shroud upstream surface 34A, the surface facing the inner peripheral side is a shroud inner peripheral surface 34B, and the surface facing the downstream side is a shroud downstream surface 34C. That is, the above-mentioned ring downstream surface 240 faces the shroud upstream surface 34A with the gap S.

(Structure of Substance Supply Unit)

Next, the configuration of the substance supply unit 5 will be described with reference to FIGS. 1 to 3. The substance supply unit 5 is provided to supply a film forming substance (FFS) to a surface of at least one of the stator blade 20 and the rotor blade 30 described above. Details of the film forming substance will be described later.

As shown in FIG. 1, the substance supply unit 5 has a storage portion 51, a supply flow path 52, and a discharge unit 53. The storage portion 51 is a container for storing the film forming substance. The supply flow path 52 is a flow path formed inside the steam turbine casing 2, and a film forming substance guided from the storage portion 51 flows through the supply flow path 52. The substance supply unit 5 is supplied to the outer peripheral ring 24 from one or a plurality of supply flow paths 52 installed on a horizontal surface or the like, and the supply flow path 52 extends in an annular shape centered on the rotation axis O in the outer peripheral ring 24. In the example of FIG. 1, the supply flow path 52 is formed only in the one-stage stator blade 20 (particularly, the final stage stator blade 20). However, the supply flow path 52 may be provided corresponding to the stator blades 20 of all stages.

As shown in FIG. 2, the end portion of the supply flow path 52 penetrates the cuter peripheral ring 24 in the radial direction and opens to the inner surface (ring inner peripheral surface 24B) in the radial direction. The discharge unit 53 extends radially inward from this opening, and thus, extends to the inside of the stator blade main body 21. The discharge unit 53 is a flow path that guides the film forming substance to the surface of the stator blade main body 21. The discharge unit 53 extends radially from a radially outer end portion of the stator blade main body 21 to a length of ⅓ of a blade height. It is also possible to adopt a configuration in which the supply flow path 52 extends over the entire area in a height direction of the blade.

Figure 3:
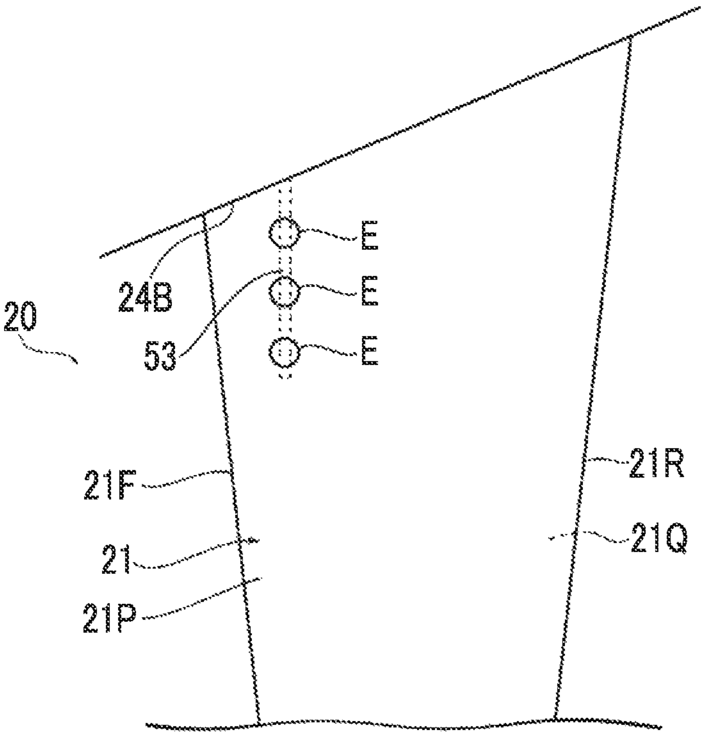
FIG. 3 is a view of a turbine stator blade according to the first embodiment of the present disclosure as viewed from a pressure surface side.
Figure 4:
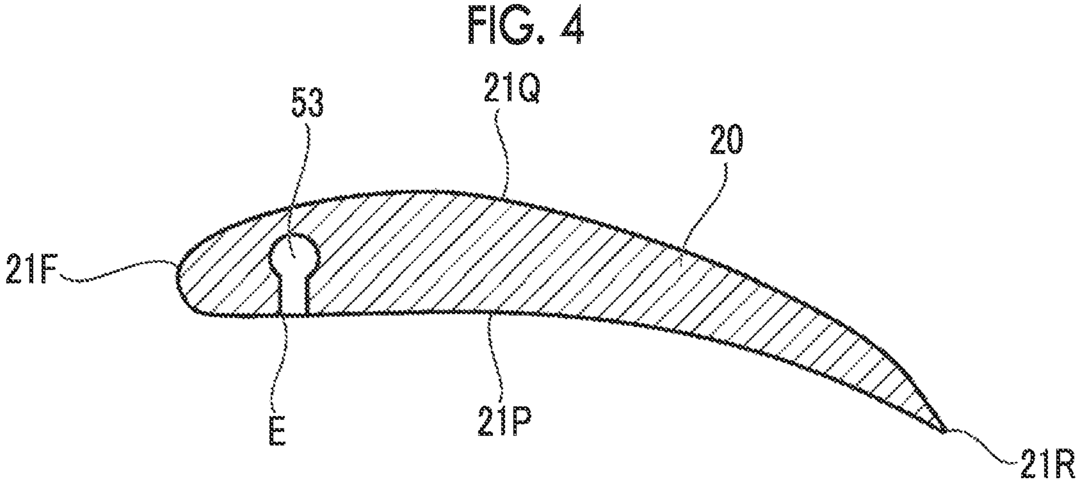
FIG. 4 is a cross-sectional view of the turbine stator blade according to the first embodiment of the present disclosure.

As shown in FIG. 3 or 4, a plurality of outlets E of the discharge unit 53 are formed on the pressure surface 21P of the stator blade main body 21 in a region biased toward the leading edge 21F. The plurality (three as an example) of outlets E are arranged at intervals in the radial direction. In the example of the drawing, a shape of the outlet E is circular.

The film forming substance pumped from the storage portion 51 by a pump or the like (not shown) is sprayed onto the pressure surface 21P from the outlet E of the discharge unit 53 through the supply flow path 52. As a result, the film forming substance forms a hydrophobic film that covers at least a portion of the pressure surface 21P. It is desirable that a supply amount of the film forming substance is 2 to several hundred ppm with respect to a flow rate of the water film formed by the condensation of steam or the adhesion of water droplets on the pressure surface 21P. The supply of the film forming substance may be continuous or intermittent.

Further, a method for improving the performance of the steam turbine 100 according to the present embodiment includes a step of supplying a film forming substance to the surface (pressure surface 21P) of the stator blade main body 21.

(Film Forming Substance)

Specifically, as the film forming substance, a volatile amine compound (coating amine) having volatile properties, a surface-active action, and anticorrosion properties, and a volatile non-amine compound are preferably used.

Specific examples of volatile amines include long-chain saturated aliphatic amines of monoamines such as dodecylamine, tridecylamine, tetradecylamine, pentadecylamine, hexadecylamine, heptadecylamine, octadecylamine, nonadecilamine, eicosylamine, and docosylamine, long-chain unsaturated aliphatic amines such as oleylamine, lysinorailamine, linoleylamine, and linolenylamine, mixed amines such as coconut oil amine, and cured cowfat amine, and mixtures thereof.

Further, a polyamine represented by the following general formula is also preferably used.

$$R^1\text{—}[NH\text{—}(CH_2)_m]_n\text{—}NH$$

In the above formula, $R^1$ represents a saturated or unsaturated hydrocarbon having 10 to 22 carbon atoms, m is an integer of 1 to 8, and n is an integer of 1 to 7. When n is 2 or more, a plurality of $[NH\text{—}(CH_2)_m]_n$ may be the same or different.

The hydrocarbon group of $R^1$ may be linear or may have a branched chain. Further, the hydrocarbon group may be annular. Specific examples thereof include an alkyl group, an alkenyl group, an alkazienyl group, and an alkynyl group. More preferably, a linear alkyl group or a linear alkenyl group is used, and the number of carbon atoms in this case is 15 to 22. From the viewpoint of suppressing corrosion, m is preferably an integer of 2 to 6. Examples of the group include a methylene group, an ethylene group (dimethylene group), a propylene group (trimethylene group), or a butylene group (tetramethylene group), and a propylene group is more preferable. Further, it is desirable that n is an integer of 1 to 3 from the viewpoint of suppressing corrosion.

Specific examples of such polyamines include dodecylaminomethyleneamine, dodecylaminodimethyleneamine, dodecylaminotrimethylamine (N-stearyl-1,3-propanediamine), tetradecyl, hexadecyl, and octadecyl compounds corresponding to these polyamines, octadecenylaminotrimethylamine, octadecenylaminodi-(trimethylamino)-trimethylethyleneamine, palmitylaminotrimethylamine, tallow alkyldiamine ethoxylate, and the like. It is more desirable to use N-oleyl-1,3-propanediamine (that is, N-octadecenylpropane-3-diamine) which is easily available with sufficient purity. The product name "Ethiduomine" manufactured by Akzo can also be preferably used.

As the volatile non-amine compound, polyethylene (20) sorbitan monostearate, sorbitan monostearate, and sorbitan monolaurate are used.

In addition, only one of these substances may be used as a film forming substance, or two or more of these substances may be mixed to form a film forming substance.

(Action Effect)

According to the above configuration, the film forming substance (FFS) is directly supplied to the surface of the stator blade main body 21 through the discharge unit 53. As a result, a hydrophobic film is formed on the surface, and the possibility that condensed water droplets adhere to a wall surface of the stator blade can be reduced. As a result, occurrence of coarse water droplets caused by the water film on the wall surface of the stator blade being re-emitted into the steam from the trailing edge of the stator blade is suppressed, and the erosion caused by the collision of the coarse water droplets with the rotor blade 30 on the downstream side can be avoided. In addition, turbine efficiency can be improved because an acceleration loss, which is the energy of steam taken away to accelerate the coarse water droplets, and an impulse loss, which acts as a brake on rotation when the coarse water droplets collide with the rotor blades 30, can be reduced. Further, since the film forming substance has a turbulent friction reducing effect (Toms effect), the turbine efficiency can also be improved by improving a fluid flow field on the surface of the stator blade main body 21 and reducing airfoil loss. Further, since the film forming substance forms a film on the metal surface, an anticorrosion effect can be obtained.

Further, according to the above configuration, since the plurality of outlets E of the discharge unit 53 are arranged on the pressure surface 21P on the leading edge 21F side at intervals in the radial direction, the film forming substance can be stably supplied to a wider range of the pressure surface 21P.

The first embodiment of the present disclosure has been described above. It is possible to make various changes and modifications to the above configuration as long as it does not deviate from the gist of the present disclosure. For example, the outlet E of the discharge unit 53 described above can be formed on the negative pressure surface 21Q in addition to the pressure surface 21P. It is also possible to form the outlet E only on the negative pressure surface 21Q.

According to this configuration, the film forming substance can be stably supplied to a wider range of the negative pressure surface 21Q.

Figure 5:
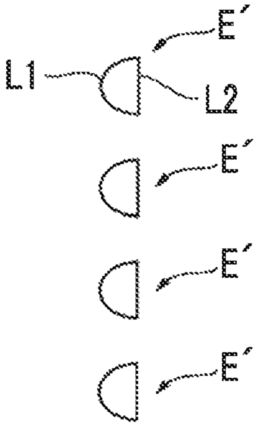
FIG. 5 is a plan view showing a modification example of a shape of an outlet of a discharge unit according to the first embodiment of the present disclosure.

Further, an opening of an outlet E' of the discharge unit 53 can be formed into a semicircular shape as shown in FIG. 5. In the example of the drawing, the outlet. E' is formed so that a radial dimension thereof gradually increases from the upstream side to the downstream side. That is, an upstream end edge L1 of the outlet E' is curved in a curved shape that is convex toward the upstream side. A downstream end edge L2 extends in the radial direction.

According to the above configuration, since the outlet E' is formed so that the radial dimension becomes larger toward the downstream side, the film forming substance can be supplied in a wider range so as to expand the film toward the downstream side.

Figure 6:
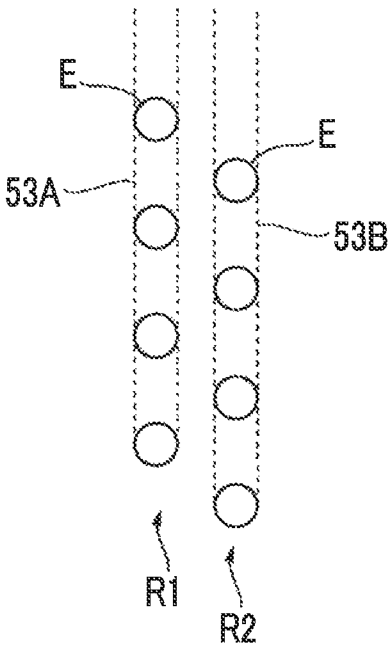
FIG. 6 is a modification example of the turbine stator blade according to the first embodiment of the present disclosure, and is a view seen from the pressure surface side.

In addition, as shown in FIG. 6, a configuration can be adopted, in which a plurality of rows (for example, rows R1 and R2) of outlets E are formed from the upstream side to the downstream side, and the radial positions of the outlets E are different between the rows adjacent to each other. In this configuration, one discharge unit 53A and one discharge unit 53B are formed corresponding to the rows R1 and R2, respectively.

According to the above configuration, even when the outlet E of a specific row or one of the discharge units 53A and 53B is blocked, the film forming substance can continue to be supplied through the other outlet E (or the other of the discharge units 53A and 53B) of the adjacent row. As a result, the steam turbine 100 can be operated more stably.

Second Embodiment

Figure 7:
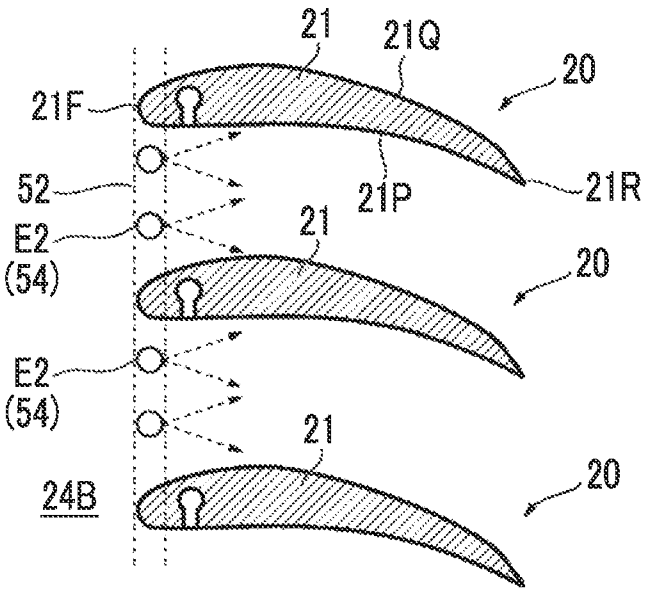
FIG. 7 is a view of a steam turbine according to a second embodiment of the present disclosure as viewed from a radial direction.
Figure 8:
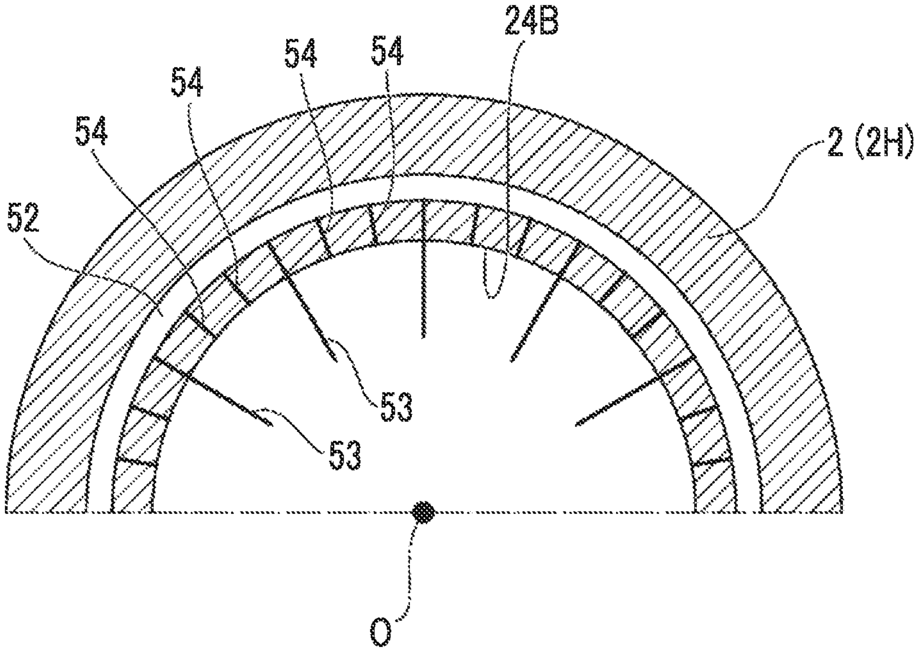
FIG. 8 is a view of the steam turbine according to the second embodiment of the present disclosure as viewed from a rotation axis direction.

Next, a second embodiment of the present disclosure will be described with reference to FIGS. 7 and 8. The same components as those in the first embodiment are designated by the same reference numerals, and detailed description thereof will be omitted. As shown in FIGS. 7 and 8, in the present embodiment, a substance supply unit 5 further has a plurality of inner peripheral surface discharge units 54 extending radially inward from the above-mentioned supply flow path 52. The inner peripheral surface discharge unit 54 extends from the supply flow path 52 extending in an annular shape inside the steam turbine casing 2 toward an inner peripheral side, and an outlet E2 opens on a ring inner peripheral surface 24B. At least one inner peripheral surface discharge unit 54 (two in the example of FIG. 7) is provided between the stator blades 20 adjacent to each other. The plurality of inner peripheral surface discharge units 54 are arranged at intervals in the circumferential direction. In FIG. 8, the stator blade 20 is omitted for the sake of simplification.

According to the above configuration, a film forming substance can be supplied from the ring inner peripheral surface 24B to the wall surface of the stator blade 20 by the inner peripheral surface discharge unit 54. Further, by providing the inner peripheral surface discharge unit 54, the film forming substance can be supplied to both a pressure surface 21P and a negative pressure surface 21Q of a stator blade main body 21.

The second embodiment of the present disclosure has been described above. It is possible to make various changes and modifications to the above configuration as long as it does not deviate from the gist of the present disclosure. For example, the discharge unit 53 described in the first embodiment and the inner peripheral surface discharge unit 54 described in the second embodiment can be used in combination.

Third Embodiment

Figure 9:
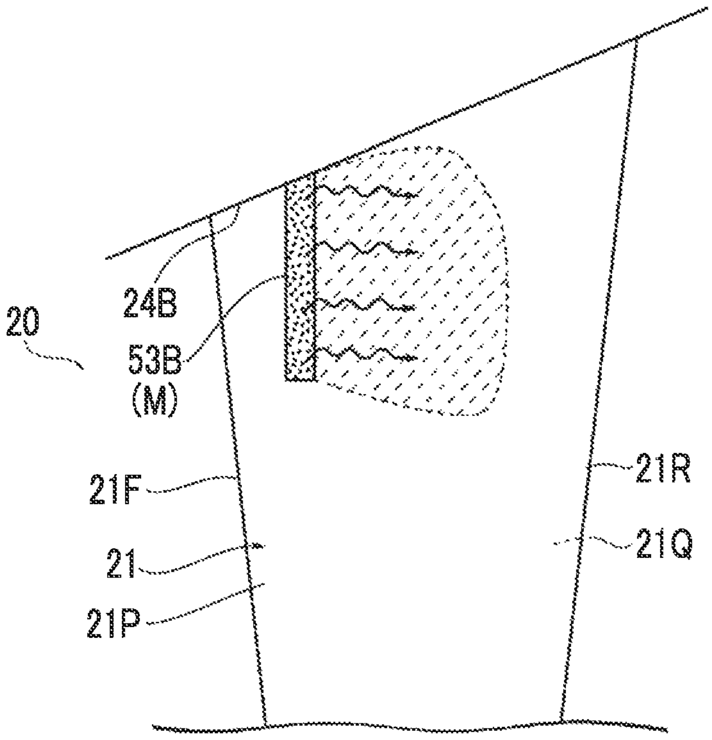
FIG. 9 is a view of a turbine stator blade according to a third embodiment of the present disclosure as viewed from a pressure surface side.

Next, a third embodiment of the present disclosure wilt be described with reference to FIG. 9. The same components as those in the above-described embodiments are designated by the same reference numerals, and detailed description thereof will be omitted. As shown in the drawing, in the present embodiment, a configuration of a discharge unit 53B is different from that of each of the above embodiments. The discharge unit 53B has a block shape integrally formed of the porous material M. Further, the porous material M is embedded so as to be flush with a surface (pressure surface 212) of a stator blade main body 21. As the porous material N, a ceramic or metal porous body formed by additive manufacturing (3D printer) or the like is preferably used.

According to the above configuration, a film forming substance can be discharged from the discharge unit 53B formed of the porous material M so as to exude. As a result, smaller amount of the film forming substance can be uniformly supplied to a wider range.

The third embodiment of the present disclosure has been described above. It is possible to make various changes and modifications to the above configuration as long as it does not deviate from the gist of the present disclosure. For example, the porous material M of the discharge unit 53B described in the third embodiment can be applied to the inner peripheral surface discharge unit 54 described in the second embodiment.

Further, as a modification example common to each embodiment, a configuration can be adopted in which a film forming substance is supplied to the rotor blade 30 in addition to the stator blade 20, and it is also possible to improve the anticorrosion performance of the rotor blade 30 by the film formed on the surface of the rotor blade 30. In this case, a configuration is conceivable in which a flow path is formed inside the shaft 3 and a film forming substance is supplied from the flow path to the surface of the rotor blade 30. Since the stator blade 20 and means for supplying the film forming substance can be shared, rust-inhibiting of the rotor blade 30 can be improved with the minimum configuration.

ADDITIONAL NOTES

The steam turbine 100 and the method for improving the performance of the steam turbine 100 described in each embodiment are grasped as follows, for example.

(1) According to a first aspect, there is provided a steam turbine 100 including: a shaft 3 that rotates around a rotation axis O; a plurality of rotor blades 30 that extend in a radial direction from an outer peripheral surface of the shaft 3 and are arranged in a circumferential direction; a casing main body (casing main body 2H) that covers the shaft 3 and the rotor blade 30 from an outer peripheral side; a plurality of stator blades 20 that extend in the radial direction from a position on an upstream side of the rotor blade 30 on an inner peripheral surface of the casing main body and are arranged in the circumferential direction; and a substance supply unit 5 that supplies, to a surface of at least one of the rotor blade 30 and the stator blade 20, a film forming substance having hydrophobicity to water droplets adhering to the surface, in which the substance supply unit 5 includes a storage portion 51 that stores the film forming substance, a supply flow path 52 which is formed inside the casing main body and through which the film forming substance guided from the storage portion 51 flows, and a discharge unit 53 that is formed inside at least one of the rotor blade 30 and the stator blade 20 and guides the film forming substance to the surface.

According to the above configuration, the film forming substance (FFS) is directly supplied to the surface of the stator blade main body 21 through the discharge unit 53. As a result, a hydrophobic film is formed on the surface, and the possibility that condensed water droplets adhere to a wall surface of the stator blade can be reduced. As a result, occurrence of coarse water droplets caused by the water film on the wall surface of the stator blade being re-emitted into the steam from the trailing edge of the stator blade is suppressed, and the erosion caused by the collision of the coarse water droplets with the rotor blade 30 on the downstream side can be avoided. In addition, turbine efficiency can be improved because an acceleration loss, which is the energy of steam taken away to accelerate the coarse water droplets, and an impulse loss, which acts as a brake on rotation when the coarse water droplets collide with the rotor blades 30, can be reduced. Further, since the film forming substance has a turbulent friction reducing effect (Toms effect), the turbine efficiency can also be improved by improving a fluid flow field on the surface of the stator blade main body 21 and reducing airfoil loss. Further, since the film forming substance forms a film on the metal surface, an anticorrosion effect can be obtained.

(2) In the steam turbine 100 according to a second aspect, a plurality of outlets E of the discharge unit 53 are arranged on a leading edge 21F side on a pressure surface 21P of at least one of the rotor blade 30 and the stator blade 20 at intervals in the radial direction.

According to the above configuration, the film forming substance can be stably supplied to a wider range of the pressure surface 21P.

(3) In the steam turbine 100 according to a third aspect, a plurality of outlets E of the discharge unit 53 are arranged on a leading edge 21F side on a negative pressure surface 21Q of at least one of the rotor blade 30 and the stator blade 20 at intervals in the radial direction.

According to the above configuration, the film forming substance can be stably supplied to a wider range of the negative pressure surface 21Q.

(4) In the steam turbine 100 according to a fourth aspect, an outlet E' of the discharge unit 53 is formed so that a radial dimension increases from an upstream side to a downstream side when viewed from the circumferential direction.

According to the above configuration, the film forming substance can be supplied in a wide range so as to expand the film toward the downstream side.

(5) In the steam turbine 100 according to a fifth aspect, a plurality of rows of outlets E of the discharge unit 53 are arranged from an upstream side to a downstream side, and radial positions of the outlets E are different between rows adjacent to each other.

According to the above configuration, even when the outlet E of a specific row is blocked, the film forming substance can be continuously supplied by the other outlets E of the adjacent rows.

(6) In the steam turbine 100 according to a sixth aspect, the substance supply unit 5 further includes a plurality of inner peripheral surface discharge units 54 which extend from the supply flow path 52 toward a portion corresponding to a leading edge 21F of at least one of the rotor blade 30 and the stator blade 20 on the inner peripheral surface of the casing main body and are arranged at intervals in the circumferential direction.

According to the above configuration, the film forming substance can be supplied from the inner peripheral surface of the casing main body to the leading edge 21F side of at least one of the rotor blade 30 and the stator blade 20 by the inner peripheral surface discharge unit 54. Further, the film forming substance can be uniformly supplied to both the pressure surface 21P and the negative pressure surface 21Q of the stator blade main body 21 only by providing the inner peripheral surface discharge unit 54.

(7) In the steam turbine 100 according to a seventh aspect, the discharge unit 53B is integrally formed of a porous material M.

According to the above configuration, a film forming substance can be discharged from the discharge unit 53B formed of the porous material M so as to exude. As a result, a smaller amount of the film forming substance can be uniformly supplied to a wider range.

(8) According to an eighth aspect, there is provided a blade 90 including a discharge unit 53 that communicates with a surface from an inside and guides, to the surface, a film forming substance having hydrophobicity to water droplets adhering to the surface.

According to the above configuration, the film forming substance (FFS) is directly supplied to the surface of the stator blade main body 21 through the discharge unit 53. As a result, a hydrophobic film is formed on the surface, and the possibility that condensed water droplets adhere to a wall surface of the stator blade can be reduced. As a result, occurrence of coarse water droplets caused by the water film on the wall surface of the stator blade being re-emitted into the steam from the trailing edge of the stator blade is suppressed, and the erosion caused by the collision of the coarse water droplets with the rotor blade 30 on the downstream side can be avoided. In addition, turbine efficiency can be improved because an acceleration loss, which is the energy of steam taken away to accelerate the coarse water droplets, and an impulse loss, which acts as a brake on rotation when the coarse water droplets collide with the rotor blades 30, can be reduced. Further, since the film forming substance has a turbulent friction reducing effect (Toms effect), the turbine efficiency can also be improved by improving a fluid flow field on the surface of the stator blade main body 21 and reducing airfoil loss. Further, since the film forming substance forms a film on the metal surface, an anticorrosion effect can be obtained.

(9) In the blade 90 according to a ninth aspect, a plurality of outlets of the discharge unit are arranged on a leading edge side on a pressure surface of the blade 90 at intervals in the radial direction.

According to the above configuration, the film forming substance can be stably supplied to a wider range of the pressure surface 21P.

(10) In the blade 90 according to a tenth aspect, a plurality of outlets of the discharge unit are arranged on a leading edge side on a negative pressure surface of the blade 90 at intervals in the radial direction.

According to the above configuration, the film forming substance can be stably supplied to a wider range of the negative pressure surface 21Q.

(11) In the blade 90 according to an eleventh aspect, an outlet of the discharge unit is formed so that a radial dimension increases from an upstream side to a downstream side when viewed from a circumferential direction.

According to the above configuration, the film forming substance can be supplied in a wide range so as to expand the film toward the downstream side.

(12) In the blade 90 according to a twelfth aspect, plurality of rows of outlets of the discharge unit are arranged from an upstream side to a downstream side, and radial positions of the outlets are different between rows adjacent to each other.

According to the above configuration, even when the outlet E of a specific row is blocked, the film forming substance can be continuously supplied by the other outlets E of the adjacent rows.

(13) In the blade 90 according to a thirteenth aspect, the discharge unit is integrally formed of a porous material.

According to the above configuration, a film forming substance can be discharged from the discharge unit 53B formed of the porous material M so as to exude. As a result, a smaller amount of the film forming substance can be uniformly supplied to a wider range.

(14) According to a fourteenth aspect, there is provided a method for improving performance and reliability of a steam turbine 100, the method including a step of supplying, to a surface of at least one of a rotor blade 30 and a stator blade 20 of a steam turbine 100, a film forming substance having hydrophobicity to water droplets adhering to the surface.

According to the above method, the film forming substance (FFS) is directly supplied to the surface of at least one of the rotor blade 30 and the stator blade 20 through the discharge unit. As a result, a hydrophobic film is formed on the surface, and the possibility of condensed water droplets adhering can be reduced. As a result, occurrence of coarse water droplets caused by the growth of minute water droplets is suppressed, and the erosion caused by the collision of the coarse water droplets with the rotor blade 30 on the downstream side can be avoided. Further, since the film forming substance has a turbulent friction reducing effect (Toms effect), it is also possible to improve a fluid flow field on the surface of at least one of the rotor blade 30 and the stator blade 20. Further, since the film forming substance forms a film on the metal surface, an anticorrosion effect can be obtained.

INDUSTRIAL APPLICABILITY

According to the present disclosure, it is possible to provide a steam turbine and a blade having further improved performance and reliability and a method for improving the performance and reliability of a steam turbine.

REFERENCE SIGNS LIST

100: Steam turbine
1: Steam turbine rotor
2: Steam turbine casing
2H: Casing main body
3: Shaft
5: Substance supply unit
20: Stator blade
21: Stator blade main body
21F: Leading edge
21P: Pressure surface
21Q: Negative pressure surface
21R: Trailing edge
22: Stator blade shroud
24: Outer peripheral ring
24A: Ring upstream surface
24B: Ring inner peripheral surface
24C: Ring downstream surface
30: Rotor blade
31: Rotor blade main body
32: Platform
34: Rotor blade shroud
34A: Shroud upstream surface
34B: Shroud inner peripheral surface
34C: Shroud downstream surface
51: Storage portion
52: Supply flow path
53, 53A, 53B: Discharge unit
54: Inner peripheral surface discharge unit
90: Blade
E, E', E2: Outlet
O: Rotation axis
L1, L2: End edge
R1, R2: Row

The invention claimed is:

1. A steam turbine comprising:

a shaft that rotates around a rotation axis;

a plurality of rotor blades that extend in a radial direction from an outer peripheral surface of the shaft and are arranged in a circumferential direction;

a casing main body that covers the shaft and the rotor blade from an outer peripheral side;

a plurality of stator blades that extend in the radial direction from a position on an upstream side of the rotor blade on an inner peripheral surface of the casing main body and are arranged in the circumferential direction; and a substance supply unit that supplies, to a surface of at least one of the rotor blade and the stator blade, a film forming substance having hydrophobicity to water droplets adhering to the surface, wherein the substance supply unit includes a storage portion that stores the film forming substance, a supply flow path which is formed inside the casing main body and through which the film forming substance guided from the storage portion flows, and a discharge unit that is formed inside the at least one of the rotor blade and the stator blade and guides the film forming substance to the surface of the at least one of the rotor blade and the stator blade, and wherein the discharge unit includes a plurality of outlets arranged on a leading edge side on a pressure surface of the at least one of the rotor blade and the stator blade at intervals in the radial direction.

2. The steam turbine according to claim 1, wherein the discharge unit includes a plurality of outlets arranged on a leading edge side on a negative pressure surface of the at least one of the rotor blade and the stator blade at intervals in the radial direction.

3. The steam turbine according to claim 1, wherein the discharge unit includes an outlet which is formed on the surface of the at least one of the rotor blade and the stator blade so that a radial dimension of the outlet increases from an upstream side to a downstream side when viewed from the circumferential direction.

4. The steam turbine according to claim 1, wherein the discharge unit includes a plurality of rows of outlets arranged on the surface of the at least one of the rotor blade and the stator blade from an upstream side to a downstream side, and radial positions of the outlets are different between rows of outlets which are adjacent to each other.

5. The steam turbine according to claim 1, wherein the substance supply unit further includes a plurality of inner peripheral surface discharge units which extend from the supply flow path toward a portion corresponding to a leading edge of at least one of the rotor blade and the stator blade on the inner peripheral surface of the casing main body and are arranged at intervals in the circumferential direction.

6. The steam turbine according to claim 1, wherein the discharge unit is integrally formed of a porous material.

7. A blade comprising a discharge unit inside the blade, wherein the discharge unit communicates with an outer surface of the blade and guides, to the outer surface, a film forming substance having hydrophobicity to water droplets adhering to the outer surface, and wherein the discharge unit includes a plurality of outlets arranged on a leading edge side on a pressure surface of the blade at intervals in a radial direction.

8. The blade according to claim 7, wherein the discharge unit includes a plurality of outlets arranged on a leading edge side on a negative pressure surface of the blade at intervals in a radial direction.

9. The blade according to claim 7, wherein the discharge unit includes an outlet which is formed on the outer surface of the blade so that a radial dimension of the outlet increases from an upstream side to a downstream side when viewed from a circumferential direction.

10. The blade according to claim 7, wherein the discharge unit includes a plurality of rows of outlets arranged on the outer surface of the blade from an upstream side to a downstream side, and radial positions of the outlets are different between rows of outlets which are adjacent to each other.

11. The blade according to claim 7, wherein the discharge unit is integrally formed of a porous material.

12. A steam turbine comprising:

a shaft that rotates around a rotation axis;

a plurality of rotor blades that extend in a radial direction from an outer peripheral surface of the shaft and are arranged in a circumferential direction;

a casing main body that covers the shaft and the rotor blade from an outer peripheral side;

a plurality of stator blades that extend in the radial direction from a position on an upstream side of the rotor blade on an inner peripheral surface of the casing main body and are arranged in the circumferential direction; and a substance supply unit that supplies, to a surface of at least one of the rotor blade and the stator blade, a film forming substance having hydrophobicity to water droplets adhering to the surface, wherein the substance supply unit includes a storage portion that stores the film forming substance, a supply flow path which is formed inside the casing main body and through which the film forming substance guided from the storage portion flows, and a discharge unit that is formed inside the at least one of the rotor blade and the stator blade and guides the film forming substance to the surface of the at least one of the rotor blade and the stator blade, and wherein the discharge unit includes a plurality of outlets arranged on a leading edge side on a negative pressure surface of the at least one of the rotor blade and the stator blade at intervals in the radial direction.

* * * * *